United States Patent [19]

Huang et al.

[11] Patent Number: 4,746,443
[45] Date of Patent: May 24, 1988

[54] BENTAZON CONTAINING WASTEWATER TREATMENT

[75] Inventors: Mao-Yao Huang, Riverview; Joseph F. Louvar, Lincoln Park, both of Mich.; Albrecht Muller, Ludwigshafen, Fed. Rep. of Germany; Hanspeter Hansen, Ludwigshafen, Fed. Rep. of Germany; Hans Merkle, Ludwigshafen, Fed. Rep. of Germany

[73] Assignee: BASF Corporation, Wyandotte, Mich.

[21] Appl. No.: 942,999

[22] Filed: Dec. 18, 1986

[51] Int. Cl.$^4$ .............................................. C02F 1/02
[52] U.S. Cl. .................................. 210/752; 210/753; 210/766; 210/909

[58] Field of Search .............. 210/749, 752, 753, 758, 210/761, 766, 909; 544/11

[56] References Cited

U.S. PATENT DOCUMENTS

| | | | |
|---|---|---|---|
| 4,402,837 | 9/1983 | Okugawa | 210/766 |
| 4,451,378 | 5/1984 | Hansen et al. | 210/737 |
| 4,525,283 | 6/1985 | Horak et al. | 210/909 |

Primary Examiner—Peter Hruskoci
Attorney, Agent, or Firm—Bernhard R. Swick

[57] ABSTRACT

The instant invention relates to a process and apparatus for treating wastewater containing bentazon by decomposing the bentazon therein and thus eliminating or substantially reducing the bentazon content. This process comprises adjusting the pH of the wastewater to a value of less than 7 and heating it to a temperature of at least about 60° C.

8 Claims, 1 Drawing Sheet

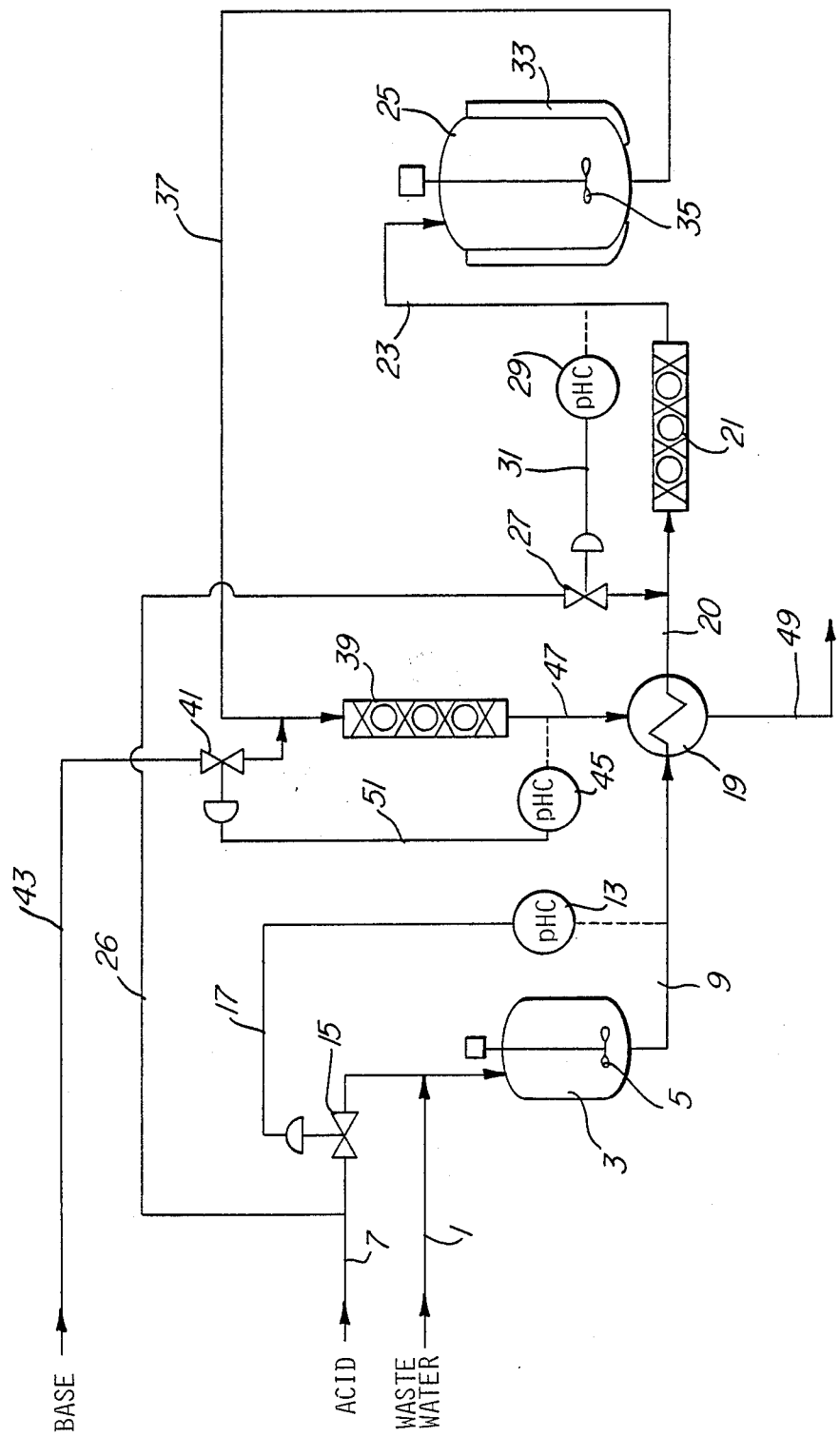

BENTAZON CONTAINING WASTEWATER TREATMENT

BACKGROUND OF THE INVENTION

The present invention relates to treatment of a wastewater effluent prior to discharge into a stream or other suitable place. More specifically, this invention relates to treatment of wastewater containing bentazon.

The compound 3-isopropyl-2,1,3-benzothiadiazin-4-one-2,2-dioxide, hereinafter referred to by its common name of bentazon, and particularly salts thereof, is an effective herbicide. However, the wastewater obtained from preparing such products contains a small amount of bentazon or salt thereof which is not readily biodegradable. Before this wastewater can be discharged into the environment, bentazon must be reduced to an acceptable level regulated by the EPA. Presently bentazon is removed from the wastewater with activated carbon packed in a column. When saturated with organics, the spent carbon is removed and later recycled via thermal regeneration. This process requires continual replacement of the spent carbon bed.

Bentazon-containing wastewater which can be treated according to the invention is obtained when bentazon is extracted from solutions of the crude active ingredient in organic solvents. For example, U.S. Pat. No. 3,875,155 discloses a process of this type and the process of the instant invention is particularly suitable for treating wastewater resulting from the process of this patent.

It is a purpose of the present invention to eliminate or substantially reduce the bentazon content of the wastewater from such process so as to be able to discharge the wastewater into the environment.

One method of treating bentazon is disclosed in U.S. Pat. No. 4,451,378 which involves adjusting the pH of the wastewater to a pH in the range of 7.5 to 9.5, i.e. an alkaline pH, adding an alkali metal or ammonium salt of bentazon followed by heating and then lowering the pH to 1 to 3 whereupon the bentazon precipitates in free form and can be readily filtered off. This process, however, requires adding additional substantially pure bentazon and also the step of filtration. The process of the instant invention on the other hand does not require filtration and the treated wastewater may be discharged directly into the environment.

Comparative Example 1 of U.S. Pat. No. 4,451,378 discloses heating the waste water at a temperature of 99° to 100° C. without adding additional bentazon. However, the pH is alkaline, i.e. 8.5. While acid is then added it is in a second container where the temperature is 20° C. The product was gelatinous and not filterable.

U.S. Pat. No. 4,402,837 discloses a process for treatment of waste liquid to prevent environmental pollution by subjecting the wastewater to a heat treatment. However, this is directed to a waste liquid containing nickel cyanide which is an entirely different impurity having entirely different properties.

Another patent of interest is U.S. Pat. No. 4,387,029 which relates to the processing by oxidation of a condensate obtained in urea production plants. The process is employed at an alkaline pH.

U.S. Pat. No. 4,216,088 treats phenolic waters formed in the manufacture of phenol formaldehyde resins and the mixture is heated in the presence of alkali.

SUMMARY OF THE INVENTION

The instant invention relates to a process for treating wastewater containing bentazon by decomposing the bentazon therein and thus eliminating or substantially reducing the bentazon content. This process comprises adjusting the pH of the wastewater to a value of less than 7 and heating it to a temperature of at least about 60° C.

BRIEF DESCRIPTION OF THE DRAWING

The drawing is a diagrammatic representation of a system according to the instant invention for decomposing bentazon in wastewater and discharging the wastewater.

DESCRIPTION OF THE PREFERRED EMBODIMENT

The process of the instant invention comprises treating wastewater containing bentazon compound by first incorporating the liquid with an acid, preferably a mineral acid, and most preferably HCl or $H_2SO_4$. Since the wastewater is substantially alkaline, it is necessary to add the acid in order to reduce the pH to an acid level, i.e. a pH less than 7. In a preferred embodiment the pH is at least about 0.2. The wastewater is then heated to a temperature of at least about 60° C., preferably about 60° to 200° C., in a suitable heated reactor.

The pressure at which the reaction is carried out should be sufficient to prevent the wastewater from boiling. Where the temperature is below 100° C., the pressure may be atmospheric. In general, the higher the temperature, the faster the reaction, but also the pressure should be higher in order to prevent boiling. The temperature can range from 60° to 200° C. and the pressure can range from 0 to 500, preferably 1 to 400 psig. The time for the reaction would depend on the temperature and pressure and can range from five minutes to 50 hours, preferably about 1 to about 6 hours.

The process may be a batch process using a conventional container such as a tank or kettle which may or may not be pressurized depending on the desired conditions. Preferably the reactor would be a stirred tank reactor. Also, tubular reactors may be employed. The process can also be a continuous process wherein if the reactor is a stirred tank-type reactor, the wastewater would enter generally near the bottom and could exit through an overflow near the top thereof. In order to provide adequate residence time in a continuous process for the conditions of temperature and pressure selected, a series of stirred tank reactors may be employed with the wastewater overflowing from the upper part of one to the lower part of the next, and overflowing from the upper part of that one to the lower part of the next one, etc. Also, a tubular reactor may be employed, the simplest of which would be a jacketed pipe having a hot fluid in the jacket, preferably steam. Where a pressure above atmospheric is to be employed, a pressure reducing valve could be provided at the discharge end of the reactor. The dimensions of the tubular reactor must be chosen to provide adequate residence time to achieve the desired treatment of the wastewater.

This process provides for a significant reduction of the bentazon concentration in the wastewater. For example, a typical wastewater may contain as much as 1200 ppm of bentazon which, in some cases, can be reduced whereby the effluent is as low as 15 ppm or lower.

With reference now more particularly to the drawing illustrating one preferred embodiment of the invention, bentazon-rich wastewater, which is generally highly alkaline, is fed through a conduit (1) to a suitable container (3) which is provided with an agitator (5). A suitable acid such as HCl is added to the wastewater in container (3) through a conduit (7) where it is mixed with said wastewater. The mixture then flows out of container (3) through conduit (9). A suitable pH sensing device, (not shown), is provided in conduit (9) and connected by suitable means, electrical, pneumatic, etc., to a pH controller (13). pH controller (13) is, in turn, connected by suitable means such as electrical or pneumatic means to an automatic control valve (15) in conduit (7). As shown in the drawing, control valve (15) is a pneumatically operated valve and accordingly it is connected to pH controller (13) by a pneumatic conduit (17). The pH controller (13) controls the pH in conduit (9) at the desired level which, preferably, is from about 0.2 up to 7, depending on other process conditions, by controlling the supply of acid going through conduit (7) to be mixed with the wastewater in container (3).

In order to conserve energy, a wastewater preheater (19) is provided through which said wastewater passes to a suitable mixing device such as an in-line mixer (21) through a conduit (20). These devices are well known to those skilled in the art and need not be described in detail here. Such an in-line mixer is shown and described in U.S. Pat. No. 4,309,223 and indicated generally in the drawing thereof by the numeral 40. The wastewater then flows from in-line mixer (21) through conduit (23) to container (25) which serves as a reactor. The pH of the wastewater is further controlled by adding additional acid through conduit (26) and pneumatically operated control valve (27) to conduit (20). A conventional pH sensor is provided in the conduit (23) for determining the pH of the wastewater going into the reactor (25), and this sensor is connected by suitable means such as electrical means or pneumatic means to a conventional pH controller (29) which controls the valve (27) through a pneumatic conduit (31). In lieu of a pneumatic control valve and conduit, an electrical control system and electrically operated valve may be substituted.

Reactor (25) may be a suitable container such as a tank, preferably closed to permit the application of pressure and which may be heated by suitable means such as steam in a jacket (33). The reactor also may be provided with a suitable agitator (35). In the reactor, the wastewater is heated to a suitable decomposing temperature of at least about 60° C. to decompose the bentazon. Faster reaction is achieved at temperatures higher than this and the temperatures preferably would not exceed 200° C. Where a temperature higher than 100° C. is employed, it is desirable to apply pressure higher than atmospheric in order to prevent boiling or vaporizing. The pressure would depend on the temperature employed but preferably should not exceed 500 psig. The reaction time may vary from as little as five minutes to as much as 50 hours, depending on the conditions employed such as size of the container (25), temperature and pressure.

The treated wastewater then flows from the reactor (25) through a conduit (37) to an in-line mixer (39) similar to in-line mixer (21). Sufficient sodium hydroxide or other suitable base is then added to the wastewater through conduit (43) and control valve (41) to conduit (37) and the treated wastewater and base, such as sodium hydroxide, are mixed in in-line mixer (39). The amount of sodium hydroxide added is controlled by control valve (41) which, as shown, is a pneumatically operated control valve controlled through pneumatic conduit (51) by pH controller (45) based on the pH determined by a conventional pH sensor, (not shown), in the exit conduit (47) from mixer (39). An electrically operated control valve, connected electrically to controller (45) may be employed in lieu of pneumatic valve (41) and pneumatic conduit (51). The sensor is a conventional sensor connected to the controller by suitable means such as electrical or pneumatic means.

The wastewater flows from mixer (39) through conduit (47), preheater (19) and is discharged through conduit (49). In preheater (19), the heat of the treated wastewater is exchanged with the in-coming untreated wastewater to thereby preheat the untreated wastewater entering the preheater through conduit (9) thus conserving energy. The purpose of the sodium hydroxide or other alkali that is mixed with the treated wastewater is to neutralize the acidity of such wastewater so that an essentially neutral product will be discharged to the environment.

As used herein, all quantities, percentages, and proportions are by weight and all temperatures are in degrees centigrade.

It is to be understood that various changes and modifications may be made in the foregoing process without departing from the spirit of the invention and scope of the appended claims wherein what is claimed is:

1. A process for treating alkaline wastewater containing 3-isopropyl-2,1,3-benzothiadiazin-4-one-2,2-dioxide (bentazon) comprising:
    adjusting the pH of said wastewater to a value of about 0.2 to a value less than 7, then heating to a temperature of at least about 60° C. and a pressure of from 0 to 500 psig for a period of from about five minutes to 50 hours, to decompose said bentazon and reduce the bentazon content of said wastewater.

2. The process of claim 1 wherein said wastewater is heated at a temperature of from about 60° to 200° C., at a pressure of about 1 to 400 psig, for a period of about one to six hours.

3. The process of claim 2 wherein said process is a continuous process.

4. A process for treating alkaline wastewater containing 3-isopropyl-2,1,3-benzothiadiazin-4-one-2,2-dioxide (bentazon) whereby said bentazon is decomposed comprising:
    incorporating a mineral acid in said wastewater in an amount sufficient to adjust the pH to a value of about 0.2 to a value less than 7; supplying said wastewater to a reactor through a conduit;
    heating the wastewater in said reactor to a temperature of from about 60° to 200° C.;
    reacting said wastewater in said reactor for a period of from about one to six hours at a pressure of from about 1 to 400 psig;
    discharging from the reactor an effluent having a bentazon content of less than about 15 ppm;
    and neutralizing said effluent with a base.

5. The process of claim 4 wherein said wastewater is preheated in exchange with the discharged liquid.

6. The process of claim 5 wherein additional acid is added to said wastewater subsequent to the preheating step.

7. The process of claim 6 wherein said acid is hydrochloric acid.

8. The process of claim 7 wherein said base is sodium hydroxide.

* * * * *